(12) United States Patent
Gaddis et al.

(10) Patent No.: US 6,241,259 B1
(45) Date of Patent: Jun. 5, 2001

(54) LOCKING CHUCK

(75) Inventors: Benjamin A. Gaddis, Clemson; Gregory S. Taylor, Seneca, both of SC (US)

(73) Assignee: Power Tool Holders, Incorporated, Christiana, DE (US)

( * ) Notice: Subject to any disclaimer, the term of this patent is extended or adjusted under 35 U.S.C. 154(b) by 0 days.

(21) Appl. No.: 09/491,442

(22) Filed: Jan. 26, 2000

Related U.S. Application Data

(63) Continuation of application No. 09/211,622, filed on Dec. 15, 1998.

(51) Int. Cl.$^7$ .................................................... B23B 31/12
(52) U.S. Cl. ........................... 279/63; 279/60; 279/150; 279/902; 408/240
(58) Field of Search .................... 279/60–63, 140, 279/150, 902; 408/240

(56) References Cited

U.S. PATENT DOCUMENTS

| | | | |
|---|---|---|---|
| 1,188,532 | * 6/1916 | Cobey | ...................................... 279/63 |
| 1,509,061 | * 9/1924 | Hardwicke | .............................. 279/60 |
| 1,985,242 | 12/1934 | DeBack . | |
| 2,458,824 | 1/1949 | Axelsson . | |
| 2,684,856 | 7/1954 | Stoner . | |
| 2,716,555 | 8/1955 | Rowe . | |
| 3,237,955 | 3/1966 | McCarthy et al. . | |
| 3,325,166 | 6/1967 | McCarthy et al. . | |
| 3,506,277 | 4/1970 | Harms . | |
| 3,545,776 | 12/1970 | Haviland . | |
| 3,945,751 | * 3/1976 | Johnson | ................................. 408/139 |
| 4,272,087 | 6/1981 | Rohm . | |
| 4,277,074 | 7/1981 | Kilberis . | |
| 4,317,579 | * 3/1982 | Welch | ..................................... 279/60 |
| 4,323,324 | 4/1982 | Eberhardt . | |
| 4,358,230 | 11/1982 | Rohlin . | |
| 4,389,146 | 6/1983 | Coder . | |
| 4,395,170 | * 7/1983 | Clarey | ..................................... 279/62 |
| 4,460,296 | 7/1984 | Sivertson, Jr. . | |
| 4,498,682 | 2/1985 | Glore . | |
| 4,526,497 | 7/1985 | Hatfield . | |
| 4,536,113 | 8/1985 | Hatfield . | |
| 4,563,013 | 1/1986 | Hunger et al. . | |
| 4,607,855 | 8/1986 | Rohm . | |
| 4,621,820 | 11/1986 | Rohm . | |
| 4,627,626 | 12/1986 | Rohm . | |
| 4,627,627 | 12/1986 | Rohm . | |
| 4,627,628 | 12/1986 | Rohm . | |
| 4,655,464 | 4/1987 | Manschitz et al. . | |
| 4,669,932 | 6/1987 | Hartley . | |
| 4,682,918 | 7/1987 | Palm . | |
| 4,695,066 | 9/1987 | Rohm . | |
| 4,700,956 | 10/1987 | Rohm . | |

(List continued on next page.)

FOREIGN PATENT DOCUMENTS 196 06 795 C2    9/1997 (DE) .

Primary Examiner—Steven C. Bishop
(74) Attorney, Agent, or Firm—Nelson Mullins Riley & Scarborough

(57) ABSTRACT

A tool driver includes a housing and a rotatable drive shaft extending therefrom. A chuck for holding the tool includes a generally cylindrical body having a nose section and a tail section. Each of a plurality of jaws is slidably positioned in one of a plurality of angularly disposed passageways in the body. Each jaw has a jaw face and threads formed thereon. A nut is in operative communication with the drive shaft so that the drive shaft rotationally drives the nut. The nut threads engage the jaw threads so that rotation of the nut moves the jaws axially within the passageways. A sleeve is selectively actuatable to a first axial position and a second axial position. The sleeve defines a first slot that receives a detent mechanism in the first axial position and a second slot that receives the detent mechanism in the second axial position.

30 Claims, 5 Drawing Sheets

U.S. PATENT DOCUMENTS

| | | |
|---|---|---|
| 4,703,941 | 11/1987 | Rohm . |
| 4,703,942 | 11/1987 | Rohm . |
| 4,773,657 | 9/1988 | Rohm . |
| 4,836,563 * | 6/1989 | Rohm .................................. 279/63 |
| 4,840,387 | 6/1989 | McCarthy . |
| 4,844,482 | 7/1989 | Rohm . |
| 4,913,449 * | 4/1990 | Rohm .................................. 279/60 |
| 4,915,555 | 4/1990 | Smothers . |
| 4,951,955 | 8/1990 | Sakamaki . |
| 4,955,623 | 9/1990 | Rohm . |
| 4,958,840 | 9/1990 | Palm . |
| 4,968,191 | 11/1990 | Palm . |
| 4,991,860 | 2/1991 | Rohm . |
| 5,009,439 | 4/1991 | Sakamaki . |
| 5,011,343 * | 4/1991 | Saban et al. ........................ 279/60 |
| 5,054,796 * | 10/1991 | Rohm .................................. 279/60 |
| 5,125,673 * | 6/1992 | Huff et al. .......................... 279/60 |
| 5,145,192 * | 9/1992 | Rohm .................................. 279/140 |
| 5,145,193 | 9/1992 | Rohm . |
| 5,171,030 | 12/1992 | Rohm . |
| 5,174,588 | 12/1992 | Reibetanz et al. . |
| 5,183,274 | 2/1993 | Sakamaki . |
| 5,191,968 * | 3/1993 | McCurry ............................. 279/150 |
| 5,234,223 | 8/1993 | Sakamaki . |
| 5,236,206 * | 8/1993 | Rohm .................................. 279/63 |
| 5,286,041 | 2/1994 | Rohm . |
| 5,375,857 | 12/1994 | Rohm . |
| 5,375,858 | 12/1994 | Rohm . |
| 5,464,230 | 11/1995 | Rohm . |
| 5,503,409 * | 4/1996 | Rohm .................................. 279/140 |
| 5,531,549 | 7/1996 | Fossella . |
| 5,624,125 | 4/1997 | Rohm . |
| 5,882,153 | 3/1999 | Mack et al. . |
| 5,927,914 | 7/1999 | Mack et al. . |
| 5,988,653 | 11/1999 | Kuo . |
| 5,992,859 | 11/1999 | Lin . |
| 6,007,071 * | 12/1999 | Middleton ........................... 279/902 |

* cited by examiner

LOCKING CHUCK

This is a continuation of U.S. patent application Ser. No. 09/211,622, filed Dec. 15, 1998.

BACKGROUND OF THE INVENTION

The present invention relates generally to powered tool drivers such as electric or pneumatic power drivers. More particularly, the present invention relates to such drivers having a chuck of the keyless type.

Power tool drivers are well known. Although twist drills are the most common tools on such drivers, the tools may also comprise screw drivers, nut drivers, burrs, mounted grinding stones, and other cutting or abrading tools. Since the tool shank may be of varying diameter or of polygonal cross section, the device is usually provided with a chuck that is adjustable over a relatively wide range. The chuck may be attached to the driver by a threaded or tapered bore or any other suitable means.

A variety of chuck types have been developed that are actuated by relative rotation between a chuck body and an annular nut. In a typical oblique jawed chuck, for example, a body member includes three passageways disposed approximately 120° apart from each other. The passageways are configured so that their center lines meet at a point along the chuck axis forward of the chuck body. Three jaws are constrained by and movable in the passageways to grip a cylindrical tool shank disposed approximately along the chuck's center axis. The nut rotates about the chuck's center and engages threads on the jaws so that rotation of the nut moves the jaws in either direction in the passageways. The body and nut are configured so that rotation of the nut in one direction (the closing direction) with respect to the body forces the jaws into gripping relationship with the tool shank, while rotation in the opposite direction (the opening direction) releases the gripping relationship. Such a chuck may be keyless if it is rotated by hand. Examples of such chucks are disclosed in U.S. Pat. Nos. 5,125,673 and 5,193,824, commonly assigned to the present assignee and the entire disclosure of each of which is incorporated by reference herein. Various configurations of keyless chucks are known in the art and are desirable for a variety of applications.

Keyless chucks actuated by relative rotation between a nut and a chuck body include means to control the rotational position of the nut and the body. For example, a first sleeve may be provided in communication with the nut while a second sleeve, which is independent of the first sleeve, may be attached to the body. Thus, a user may rotate the first sleeve with one hand while gripping the second sleeve with the other hand, thereby holding the body still. Alternatively, in some devices in which only a single sleeve is provided, a user may grip the single sleeve and actuate the tool driver to rotate the spindle, thereby rotating the chuck body with respect to the sleeve. In addition, a mechanism may be located in a driver to lock the spindle of the driver when the driver is not actuated, thus enabling use of a single sleeve chuck.

SUMMARY OF THE INVENTION

The present invention recognizes and addresses problems concerning drivers with hand operated chucks. Thus, broadly speaking, a principal object of this invention is an improved driver and keyless chuck arrangement.

Additional objects and advantages of the invention are set forth or will be apparent to those of ordinary skill in the art from the detailed description herein. Also, it should be further appreciated that modifications and variations to the specifically illustrated and discussed features may be practiced in various embodiments and uses of this invention without departing from the spirit and scope thereof, by virtue of present reference thereto. Such variations may include, but are not limited to, substitution of equivalent means and features for those shown or discussed, and the functional or positional reversal of various parts, or the like.

These and other objects may be achieved by a driver having a housing, rotatable drive shaft and a chuck. The chuck has a generally cylindrical body member with a nose section having an axial bore formed therein. The body has a plurality of angularly disposed passageways formed therein so that each of a plurality of jaws may be slidably positioned respectively therein. Each of the jaws has a face and threads formed thereon. A nut is in operative communication with the drive shaft and the threads on the jaws so that the drive shaft rotationally drives the nut with respect to the body to move the jaws axially within the passageways. A locking mechanism mounted to at least one of the housing and the body has two operative positions. The first rotationally locks the body and the housing with respect to one another. The second permits relative rotation between the body member and the housing.

In one preferred embodiment of the present invention, a chuck for use with a driver having a housing and a rotatable drive shaft includes a generally cylindrical body member having a nose section with an axial bore formed therein. The body has a plurality of angularly disposed passageways formed therein so that each of a plurality of jaws may be slidably positioned respectively therein. Each of the jaws has a face and threads formed thereon. A nut is in operative communication with the drive shaft and the threads on the jaws so that the drive shaft rotationally drives the nut so that the rotation of the nut with respect to the body moves the jaws axially within the passageways. A locking mechanism mounted to at least one of the housing and the body has two operative positions. The first rotationally locks the body and the housing with respect to one another. The second permits relative rotation between the body member and the housing.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof directed to one of ordinary skill in the art, is set forth in the specification, which makes reference to the appended figures, in which.

Figure 1:
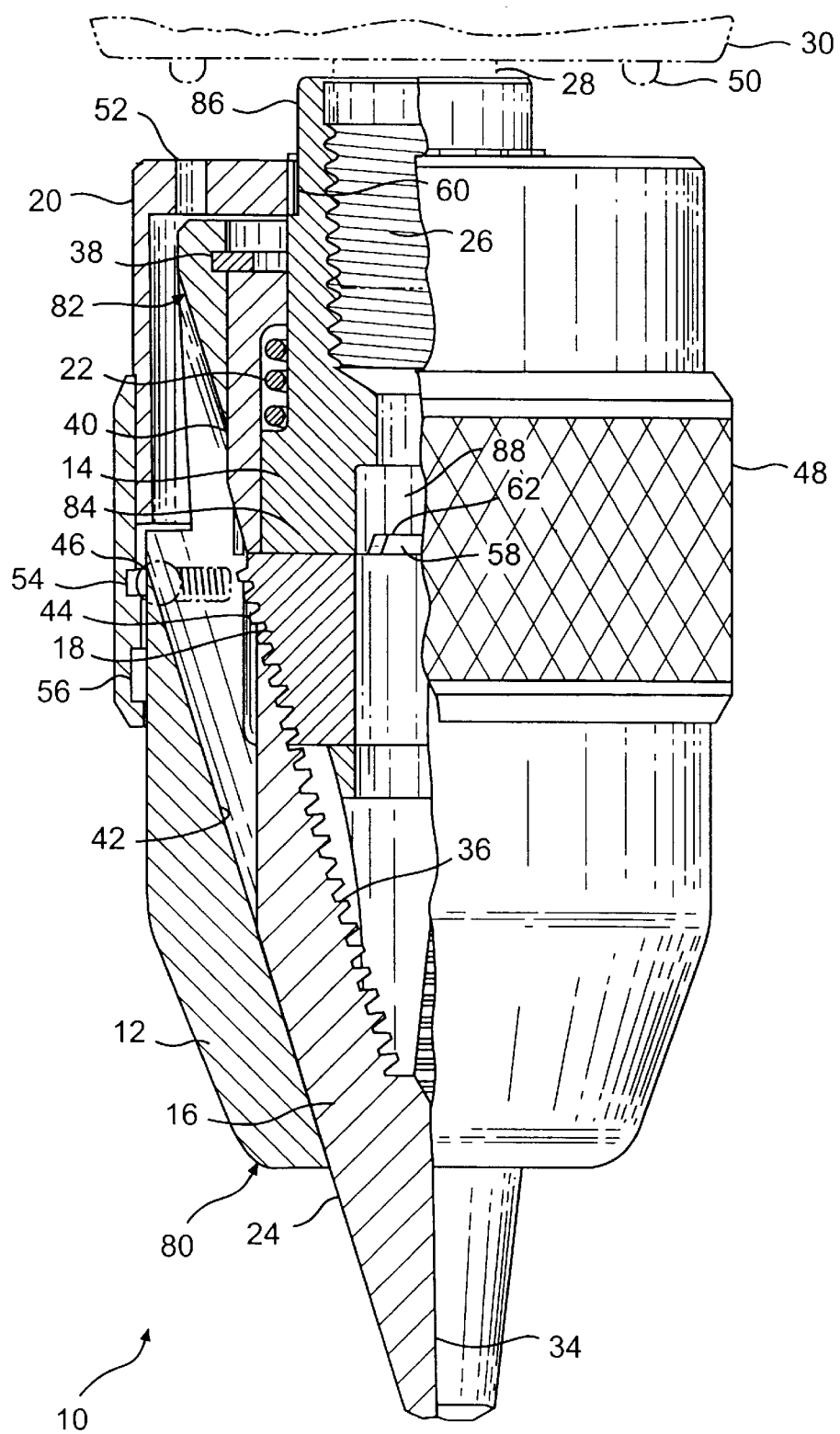
FIG. 1 is a longitudinal view, partly in section, of a chuck in accordance with an embodiment of the present invention.

Repeat use of reference characters in the present specification and drawings is intended to represent the same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention cover such modifications and variations as come within the scope of the appended claims and their equivalents.

A power drill according to the present invention is indicated in the figures in phantom by a drill housing 30 and a drive shaft 28. Although it may be possible to utilize the present invention within a non-powered drill, power drivers such as electric and pneumatic drivers are preferred. Moreover, any suitable power driver may be employed within the present invention and should be well understood in this art. Accordingly, for purposes of clarity, the drill is indicated in the Figures only by the housing and drive shaft.

In one preferred embodiment illustrated in FIGS. 1–4, a drill chuck is mated to the spindle and has a body having passageways in which jaws are held. The jaws reciprocally move (in either an opening or a closing direction) by a threadedly engaged nut. A locking mechanism, in the form of a generally cylindrical sleeve, is axially movable to either of two positions. In the first position, the sleeve rotationally locks the body to the driver housing. Because the nut may still freely rotate with respect to the body, however, actuation of the drive shaft causes relative rotation between the nut and the body to open or close the chuck, depending on the drive shaft's rotational direction. In the second position, the body and the sleeve are rotatable with respect to the drill housing.

Figure 2:
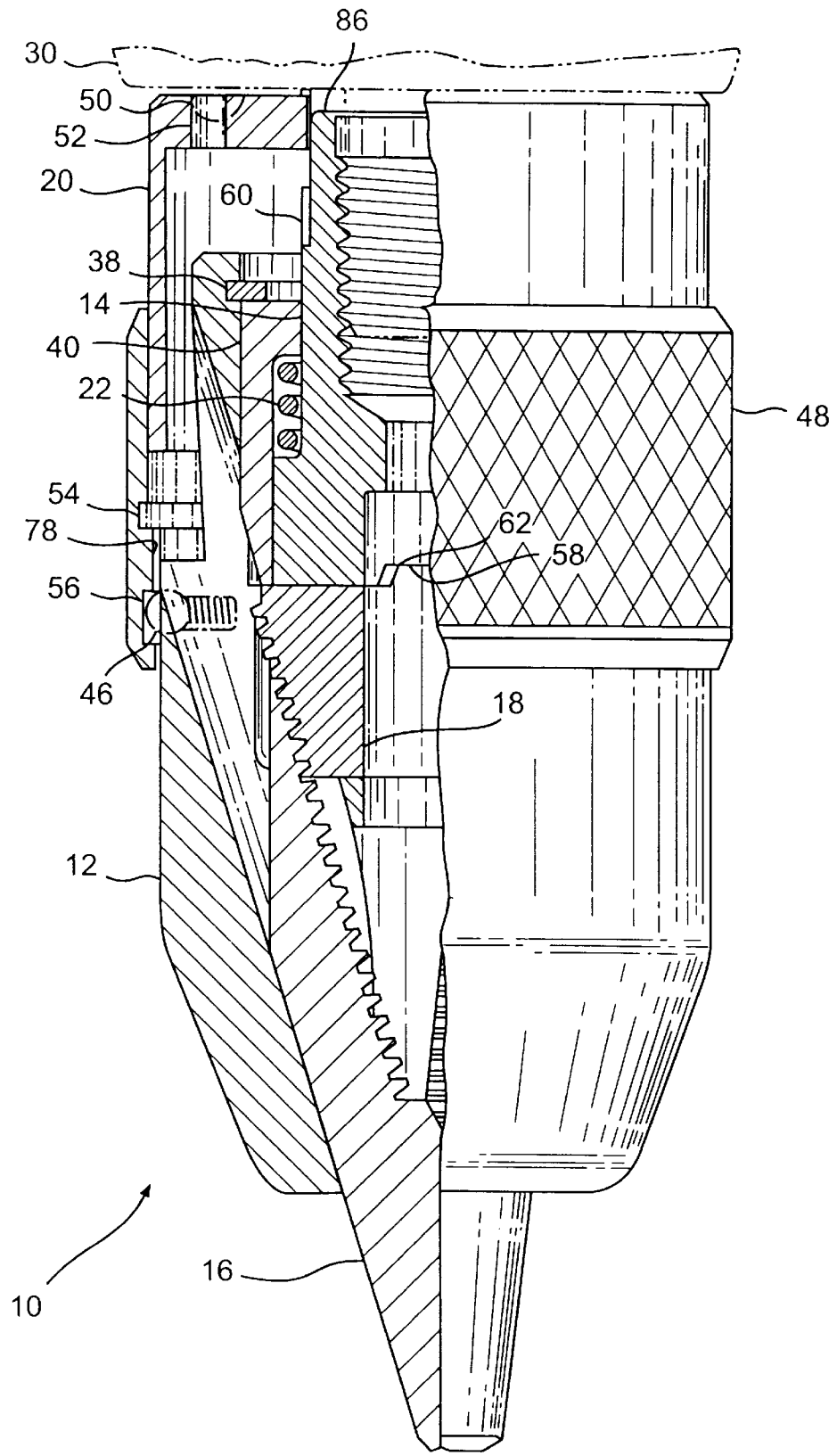
FIG. 2 is a longitudinal view, partly in section, of the chuck as in FIG. 1.

Referring to FIG. 1, the sleeve is in the second position, and it and body may freely rotate with respect to the driver housing. In FIG. 2, the sleeve is in the first position, engaging the driver housing so that the driver housing, sleeve and body are rotationally locked together.

As also shown in the figures, a drive spindle rotationally drives the nut through a clutch mechanism. The clutch mechanism rotationally locks the spindle to the nut as long as the nut does not substantially resist the rotational torque applied by a spindle ring as described in more detail below. When the resistance does overcome this torque, teeth on the nut and the spindle ring slip over each other. The nut and spindle then rotate with respect to each other so that there is an impact when the following teeth on the nut and the spindle ring engage. At high spindle rotational speeds, successive impacts further tighten the chuck. At the same time, however, the slip allowed by the clutch prevents damage to the driver and chuck components if the spindle is activated for too long a period.

Referring again to FIG. 1, a chuck 10 includes a body 12, a rear sleeve 20, a spindle ring 14, a locking ring 48, and a nut 18. Body 12 is generally cylindrical in shape and comprises a nose or forward section 80 and a tail or rearward section 82. An axial bore 24 is formed in the nose section 80 and is dimensioned somewhat larger than the largest tool shank that the chuck is designed to accommodate.

Jaw guideways 42 are formed in body 12 to accommodate each jaw 16. Three jaws 16 are employed, and each jaw is separated from the adjacent jaw by an arc of approximately 120 degrees. The axes of the jaw guideways 42 and the jaws 16 are angled with respect to the chuck axis and intersect the chuck axis at a common point ahead of chuck body 12. Each jaw 16 has a tool engaging portion 34, which is generally parallel to the axis of the chuck body 12, and threads 36. Threads 36 may be constructed in any suitable type and pitch.

Nut 18 is a one-piece nut which includes threads 44 for mating with threads 36 on jaws 16. Nut 18 is positioned in the body in engagement with the jaw threads so that when the nut is rotated with respect to the body 12, the jaws will be advanced or retracted. An outer cone formed by the nut threads forms an approximately 15 degree angle with respect to the chuck axis.

The outer circumferential surface of locking ring 48 may be knurled or may be provided with longitudinal ribs or any other configuration to enable a user to grip it securely. The sleeve may be fabricated from steel or a structural plastic such as polycarbonate, a filled polypropylene, for example glass-filled polypropylene, or a blend of structural plastic materials. Other composite materials such as, for example, graphite-filled polymerics, may also be suitable in a given environment. In one embodiment, the sleeve is constructed from the 30 percent glass-filled nylon material. As would be appreciated by one skilled in the art, materials for which the chuck of the present invention is fabricated will depend on the end use of the chuck, and the above are provided by way of example only.

Figure 3:
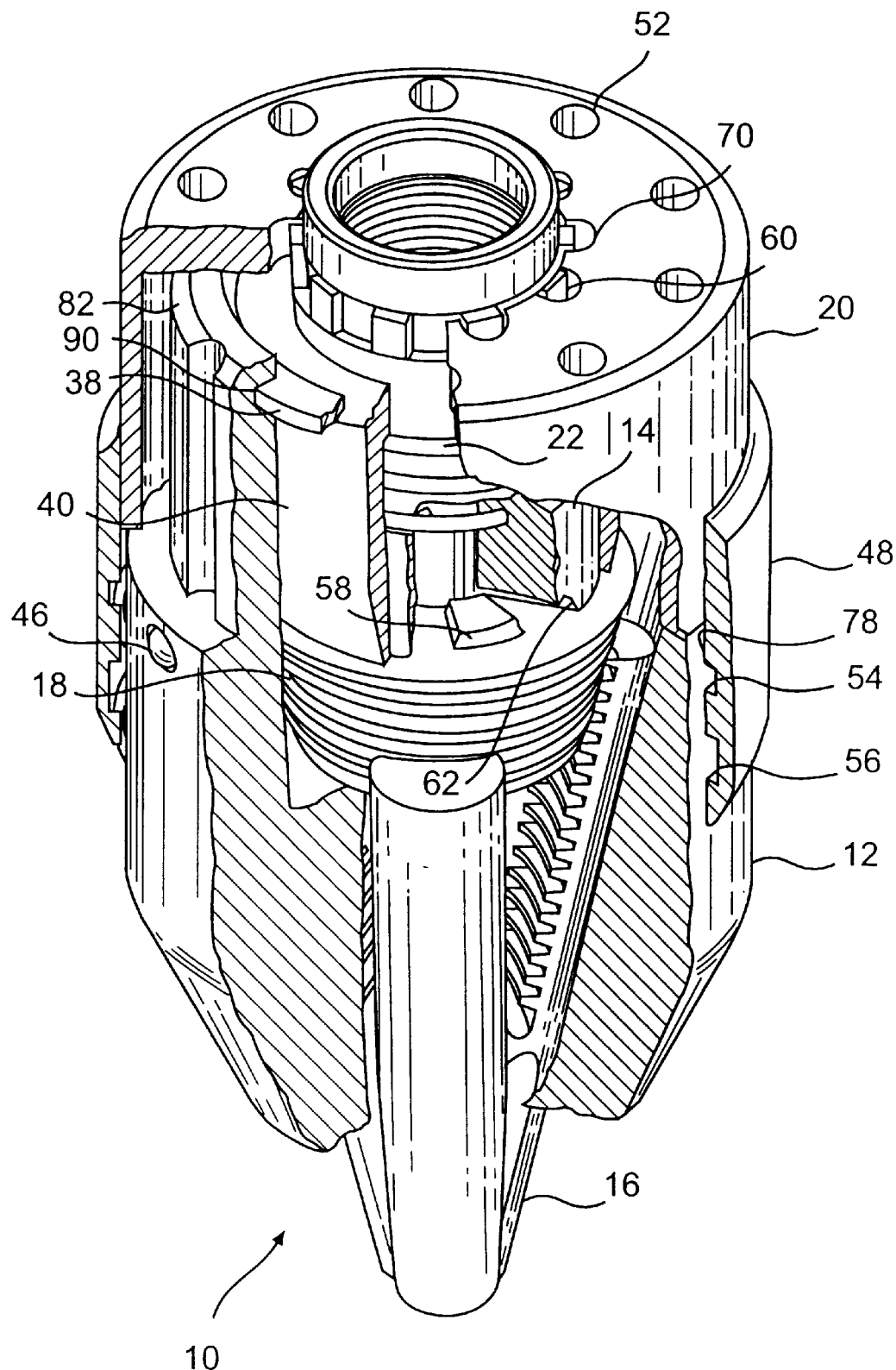
FIG. 3 is a perspective view, partly in section, of the chuck as in FIG. 1.
Figure 4:
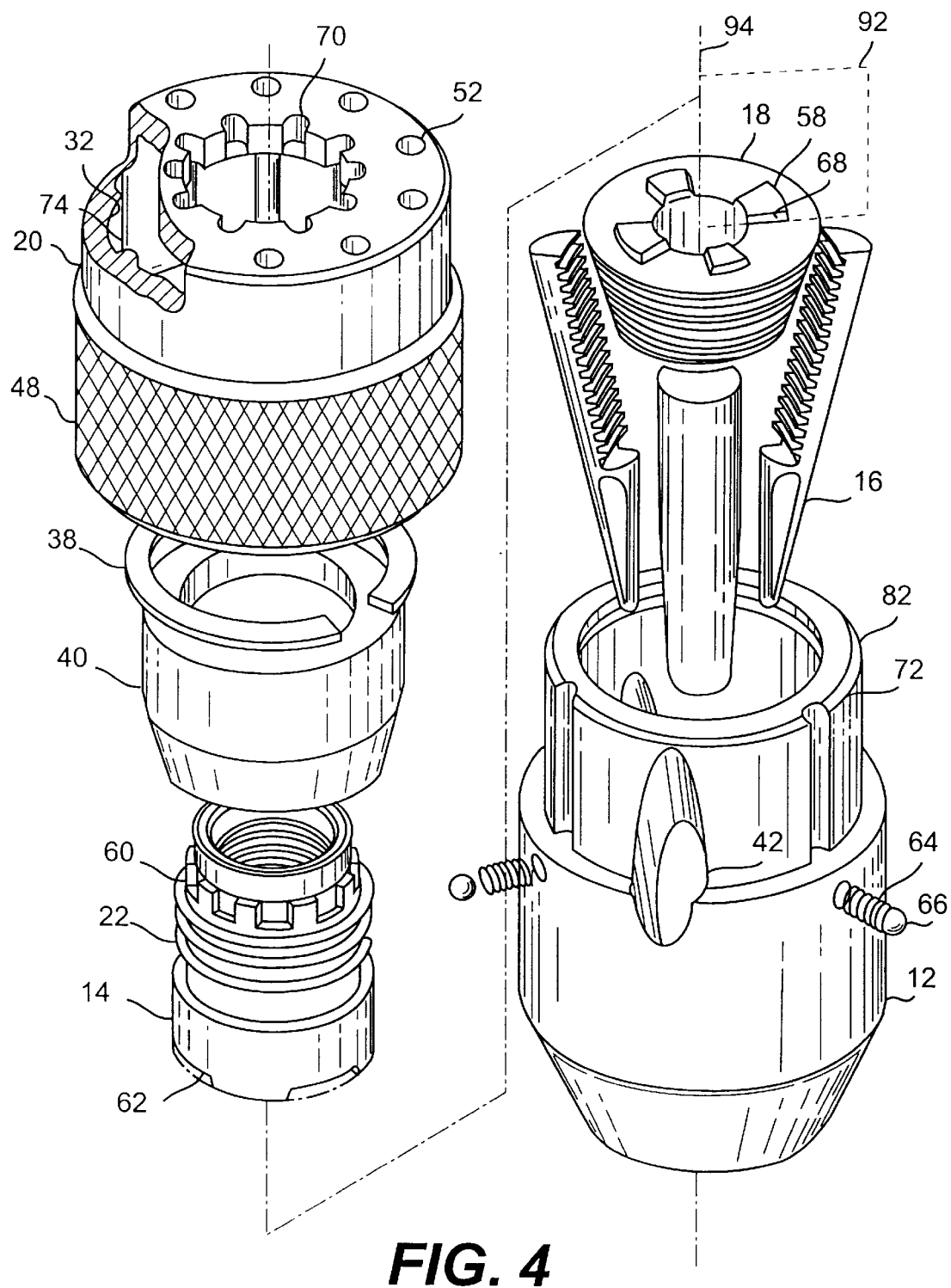
FIG. 4 is an exploded view of the chuck as in FIG. 1.

Referring also to FIGS. 3 and 4, nut 18 includes a plurality of teeth 58 which engage teeth 62 on spindle ring 14. In the illustrated embodiment, two teeth 58 and two teeth 62 are provided. Spindle ring 14 is threaded onto the drive shaft and rotationally drives the nut through teeth 58 and 62.

A locking mechanism includes a cylindrical sleeve comprising rear sleeve 20 and locking ring 48. Locking ring 48 is axially and rotationally fixed to rear sleeve 20. The cylindrical sleeve is axially reciprocal with respect to body 12 and is retained in either of two axial positions by a detent mechanism 46. In the embodiment of the present invention shown in FIGS. 1–4, detent mechanism 46 includes a coil spring 64 biasing a ball 66 into either of two annular slots 54 and 56 in locking ring 48. Each of slots 54 and 56 may be formed continuously around the inner arcuate surface 78 of locking ring 48 so as to provide ease of alignment. Although only one pair is shown in the figures, a plurality of balls 66 and respective springs 64 may be provided around the body. With the sleeve in the forward position shown in FIG. 1, detent mechanism 46 engages slot 54 and thereby holds locking ring 48 and rear sleeve 20 away from drill housing 30.

Rear sleeve 20 is rotationally locked to the body 12 by ribs 74 (FIGS. 3 and 4) received in grooves 72. Referring to the forward axial position of sleeve 20 in FIG. 1 and also referring to FIGS. 3 and 4, rear sleeve 20 rotationally locks to spindle ring 14 through the engagement of teeth 70 at the rear end of sleeve 20 and teeth 60 about the spindle ring's outer circumference. The spindle ring is, in turn, rotationally locked to spindle 28. Thus, spindle 28 rotationally drives body 12 when the rear sleeve is in its forward position.

Spindle ring 14 is generally cylindrical in shape and comprises a nose or forward section 84 and a tail or rearward section 86. An axial bore 88 is made in nose section 84. A threaded bore 26 is formed in tail section 86 and is of a standard size to mate with drive shaft 28 of the powered driver indicated in part at 30. The bores 26 and 88 may communicate at a central region of spindle ring 14. While a threaded bore 26 is illustrated, the spindle ring could include a tapered bore of a standard size to mate with a tapered drive shaft or with any other suitable connection mechanism.

When sleeve 20 is pulled rearwardly from the forward axial position shown in FIG. 1, the forward edge of slot 54 depresses balls 66 against springs 64 so that the springs compress, thereby allowing locking member 48 to ride over the balls. As the sleeve continues its rearward movement, teeth 70 disengage teeth 60, and rear sleeve 20 moves into a rearward position as shown in FIG. 2. The rear sleeve receives studs 50 into recesses 52 to rotationally lock the rear sleeve with respect to driver housing 30, and second slot 56 receives balls 66 to axially retain the rear sleeve in position.

Thus, body 12 is rotationally locked to housing 30 through the engagement of ribs 74 and grooves 72 (FIGS. 3 and 4) in body 12 and sleeve 20, respectively, and through the engagement of studs 50 and recesses 52 in sleeve 20 and housing 30, respectively. Because of the disengagement of teeth 70 from teeth 60, however, spindle ring 14 is rotatable with respect to the body.

A bearing assembly and clutch mechanism includes a clutch spring 22 bearing on one side against spindle ring 14 and on the other against a bearing ring 40. Since spindle ring 14 is mated to spindle 28, spring 22 biases bearing ring 40 rearward against a retaining clip 38 received in an annular slot in body 12, thereby biasing body 12 axially rearward with respect to the spindle. Body 12 therefore pushes nut 18 rearward against spindle ring 14. Thus, activation of spindle 28 (FIG. 1) rotates spindle ring 14 which, in turn, rotates nut 18 by teeth 58 and 62 (FIG. 4). When the body is rotationally locked to the drill housing as in FIG. 2, nut 18 therefore rotates relative to body 12, opening or closing the chuck depending on the spindle's rotational direction.

Referring now to FIG. 4, teeth 58 define sides 68 that oppose sides on teeth 62 that are substantially parallel to sides 68. Each side 68 is disposed at an approximately 30 degree angle with respect to a plane 92 that includes chuck axis 94. Thus, rotational force applied by spindle ring 14 to nut 18 tends to urge teeth 58 to ride over teeth 62. When the chuck is not fully opened or closed, the axial force applied by spring 22 overcomes this tendency, and the nut rotates with the spindle ring.

When the chuck fully closes (with or without an inserted tool) or fully opens, however, further rotation of nut 18 is resisted. This resistance overcomes the bias of spring 22, and teeth 58 ride over teeth 62, pushing nut 18 and body 12 axially forward.

When teeth 58 pass over teeth 62, clutch spring 22 returns bearing assembly 40 to its original axial position. This produces successive blows against the nut as the next set of teeth engage, thereby further tightening the chuck, or loosening the chuck if it is overtightened. The hammer effect is noticeable to the operator and therefore indicates that jaws 16 have fully tightened on the operative workpiece or that the chuck has fully opened.

Referring also to FIG. 2, the reciprocal movement of body 12 due to the relative slip between the nut and spindle ring does not disengage rear sleeve 20 from drill housing 30. Slot 56 is slightly wider than the diameter of balls 66 so that the balls can move axially forward with body 12 without moving locking member 48 and sleeve 20. Thus, the excess width should be at least equal to the distance body 12 moves. Should frictional forces nevertheless carry the locking member and sleeve forward with the body, or if slot 56 includes no extra axial width to allow movement of balls 46, studs 50 are long enough to prevent the sleeve's disengagement. That is, the length of studs 50 extending into recesses 52 is greater than the forward axial movement of body 12.

Figures 5A, 5B, 5C:
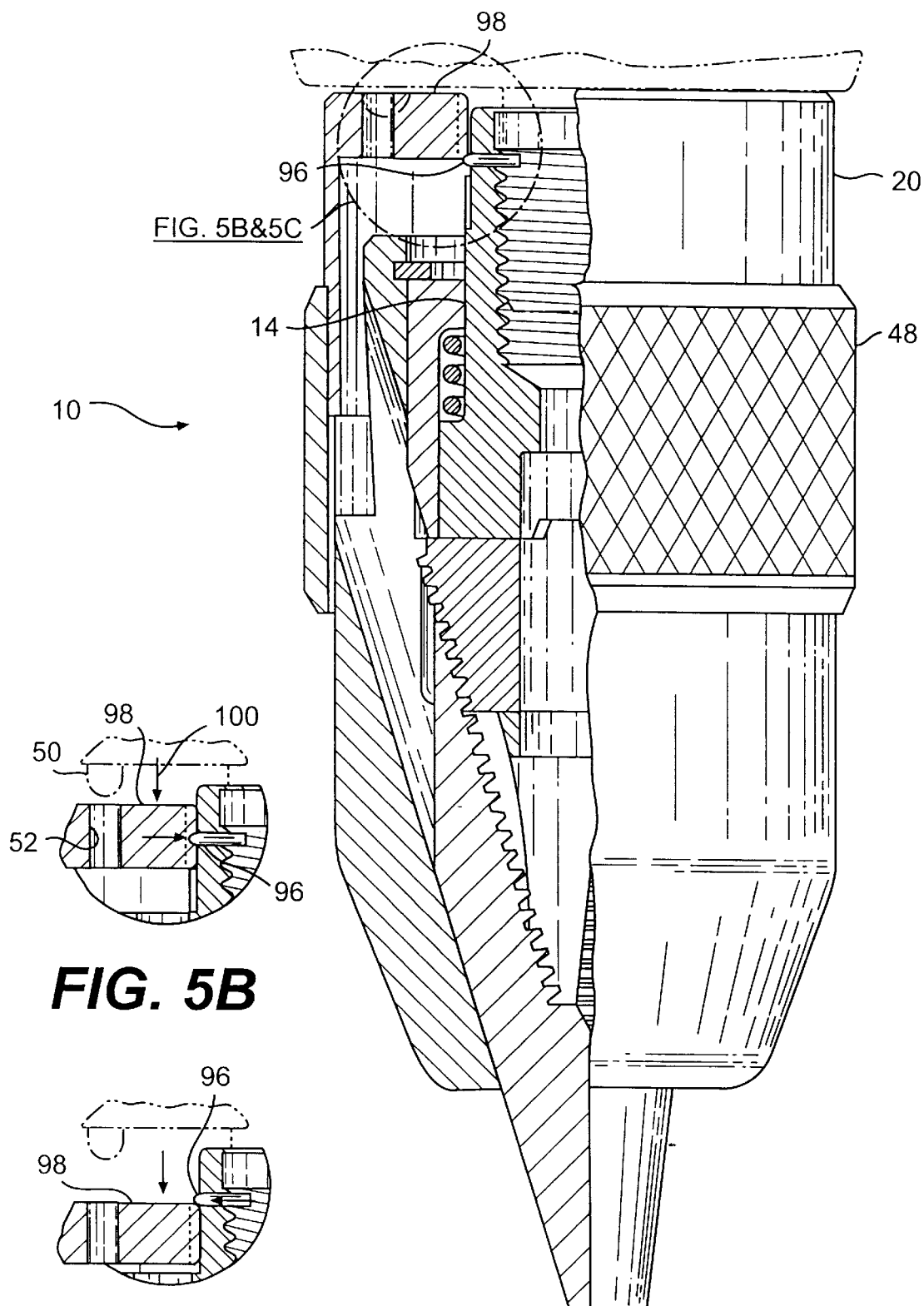
FIG. 5A is a longitudinal view, partly in section, of a chuck in accordance with an embodiment of the present invention.
FIG. 5B is an enlarged view of the section indicated in FIG. 5A in which a sleeve is riding over a detent mechanism.
FIG. 5C is an enlarged view of the section indicated in FIG. 5A in which a sleeve has passed over a detent mechanism.

FIGS. 5A–5C illustrate a chuck 10 having a detent mechanism different from that shown in FIGS. 1–4. Specifically, a C-shaped clip spring 96 is received in an outer annular groove in spindle ring 14 and has an outer diameter greater than the outer diameter of the spindle ring's rear end. Further, the outer diameter of spring 96 is greater than the inner diameter of a rear flange 98 of sleeve 20. Thus, spring 96 retains rear sleeve 20 in its rearward axial position as shown in FIG. 5A.

Referring to FIG. 5B, when the rear sleeve is moved forward (as indicated by arrow 100) to disengage the rear sleeve from studs 50, flange 98 compresses spring 96 down into the spindle ring groove. When flange 98 passes over spring 96, as shown in FIG. 5C, the resilient spring expands back to its original position and thereafter retains the rear sleeve in the forward axial position. As shown in the figures, the edges of flange 98 may be beveled to assist in riding over spring 96.

Since the detent mechanism of FIGS. 5A–5C acts between the spindle ring and rear sleeve rather than between the chuck body and the rear sleeve, there is less likelihood that the rear sleeve will be pulled forward with the chuck body when the nut and spindle ring slip with respect to each other. However, studs 50 may still extend far enough into recesses 52 to prevent disengagement of the rear sleeve from the drill housing in case forward movement of the rear sleeve should nevertheless occur.

While one or more preferred embodiments of the present invention are described above, it should be appreciated that various suitable embodiments are encompassed by the present invention. For example, the locking mechanism shown in the Figures may be replaced by any suitable mechanism such as a sleeve or lever mounted on the drill housing and selectively extendable rearward to engage the body so that the body and housing are rotationally locked with respect to each other. Furthermore, many variations in the placement, configuration, and operation of the mechanisms that rotationally and axially lock one element of the chuck to another may be realized.

Moreover, it should be understood by those skilled in the art that the chuck components described above may be arranged and configured in various suitable manners within the present invention. Various modifications and variations to the present invention may be practiced by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is provided by way of example only and is not intended to be limitative of the invention so further described in such appended claims.

What is claimed is:

1. A chuck for use with a driver having a housing and a rotatable drive shaft extending therefrom, the chuck comprising:

a generally cylindrical body having a nose section with an axial bore formed therein and a plurality of angularly disposed passageways formed therethrough and intersecting said axial bore;

a plurality of jaws, each jaw being slidably positioned in a respective one of said angularly disposed passageways and having a jaw face and threads formed thereon;

a nut in operative communication with said rotatable drive shaft so that said drive shaft rotationally drives said nut, said nut engaging said threads on said jaws so that rotation of said nut with respect to said body axially moves said jaws within said passageways;

a sleeve selectively actuatable
to a first axial operative position in which said sleeve rotationally locks the housing and said body with respect to each other, and
a second axial position in which said sleeve permits relative rotation between said body and the housing; and a detent mechanism, wherein said sleeve defines a first slot that receives said detent mechanism in said first axial position and a second slot that receives said detent mechanism in said second axial position.

2. The chuck as in claim 1, wherein said first slot is axially forward of said second slot and wider than said second slot.

3. The chuck as in claim 1, wherein said detent mechanism is axially fixed to said body.

4. The chuck as in claim 3, wherein said detent mechanism includes at least one coil spring and at least one ball, said spring biasing said ball radially outward from said body into one of said first slot and said second slot.

5. The chuck as in claim 1, wherein said sleeve is mounted to said chuck.

6. The chuck as in claim 1, including a spindle ring configured to attach to said rotatable drive shaft in driving engagement with said nut through inter-engaging teeth on said spindle ring and said nut.

7. The chuck as in claim 6, wherein said detent mechanism is on said spindle ring.

8. The chuck as in claim 7, wherein said detent mechanism is a c-shaped clip ring.

9. The chuck as in claim 1, wherein said sleeve engages said rotatable drive shaft so that said sleeve is rotationally locked to said rotatable drive shaft in said second axial position.

10. The chuck as in claim 1, including a biasing spring and a clutch, said clutch operatively disposed between said nut and said rotatable drive shaft, said biasing spring biasing said nut and said rotatable drive shaft together and said clutch rotationally disengaging said nut and said rotatable drive shaft when said jaws reach a fully closed position.

11. The chuck as in claim 10, including a spindle ring disposed between said rotatable drive shaft and said nut.

12. The chuck as in claim 11, wherein said clutch includes at least one axially forwardly extending tooth on said spindle ring that engages at least one axially rearwardly extending tooth on said nut to rotationally drive said nut, and wherein said at least one spindle ring tooth disengages said at least one nut tooth when said jaws reach a fully closed position.

13. The chuck as in claim 12, wherein said at least one spindle ring tooth is configured so that said at least one spindle ring tooth disengages from said at least one nut tooth when said jaws reach a fully opened position.

14. The chuck as in claim 10, wherein said biasing spring is a coil spring.

15. The chuck as in claim 10, wherein said biasing spring prevents relative rotation between said rotatable drive shaft and said nut prior to said jaws reaching a fully closed position when said jaws are moving in a closing direction.

16. A chuck for use with a driver having a housing and a rotatable drive shaft extending therefrom, the chuck comprising:

a generally cylindrical body having a nose section with an axial bore formed therein and a plurality of angularly disposed passageways formed therethrough and intersecting said axial bore;

a plurality of jaws, each said jaw being slidably positioned in a respective one of said angularly disposed passageways and having a jaw face and threads formed thereon;

a nut in operative communication with said rotatable drive shaft so that said drive shaft rotationally drives said nut, said nut engaging said threads on said jaws so that rotation of said nut with respect to said body axially moves said jaws within said passageways; and a sleeve selectively actuatable to
a first axial position in which said sleeve rotationally locks said housing and said body with respect to each other, and
a second axial position in which said sleeve permits relative rotation between said body and said housing,
wherein said body is axially reciprocal with respect to said housing and said rotatable drive shaft.

17. The chuck as in claim 16, wherein said sleeve is mounted to said chuck.

18. The chuck as in claim 17, wherein said sleeve is axially reciprocal with respect to said body.

19. The chuck as in claim 18, wherein said sleeve is configured so that when said sleeve is in said first axial position, rotation of said rotatable drive shaft in a closing direction causes said jaws to move towards a closed position.

20. The chuck as in claim 16, wherein said jaws are non-rotatable with respect to said housing when said sleeve is in said first axial position.

21. The chuck as in claim 16, wherein said nut is axially reciprocal with respect to said rotatable drive shaft and said housing.

22. The chuck as in claim 16 wherein said nut threads are on a radially outwardly facing surface of said nut.

23. The chuck as in claim 22 wherein said nut threads are on a radially outward facing conical surface of said nut.

24. The chuck as in claim 16, wherein said jaw threads face radially inward from said jaws towards a chuck axis extending from said rotatable drive shaft.

25. The chuck as in claim 16, wherein said jaws are axially reciprocal with respect to said housing and said rotatable drive shaft.

26. The chuck as in claim 16, wherein a spindle ring is configured to attach to said rotatable drive shaft and drives said nut through inter-engaging teeth on said spindle ring and said nut.

27. A chuck for use with a driver having a housing and a rotatable drive shaft extending therefrom, the chuck comprising:

a generally cylindrical body having a nose section with an axial bore formed therein and a plurality of angularly disposed passageways formed therethrough and intersecting said axial bore;

a plurality of jaws, each said jaw being slidably positioned in a respective one of said angularly disposed passageways and having a jaw face and threads formed thereon;

a nut in operative communication with said rotatable drive shaft so that said drive shaft rotationally drives said nut, said nut engaging said threads on said jaws so that rotation of said nut with respect to said body axially moves said jaws within said passageways; and a sleeve selectively actuatable to
- a first axial position in which said sleeve rotationally locks said housing and said body with respect to each other, and
- a second axial position in which said sleeve permits relative rotation between said body and said housing, wherein said nut threads are on a radially outwardly facing surface of said nut.

28. The chuck as in claim 27, wherein said nut threads are on a radially outward facing conical surface of said nut.

29. A chuck for use with a driver having a housing and a rotatable drive shaft extending therefrom, the chuck comprising:

a generally cylindrical body having a nose section with an axial bore formed therein and a plurality of angularly disposed passageways formed therethrough and intersecting said axial bore;

a plurality of jaws, each said jaw being slidably positioned in a respective one of said angularly disposed passageways and having a jaw face and threads formed thereon;

a nut in operative communication with said rotatable drive shaft so that said drive shaft rotationally drives said nut, said nut engaging said threads on said jaws so that rotation of said nut with respect to said body axially moves said jaws within said passageways; and means for locking said body to said housing, said locking means selectively actuatable to
- a first axial position in which said locking means rotationally locks said housing and said body with respect to each other, and
- a second axial position in which said locking means permits relative rotation between said body and said housing.

30. The chuck as in claim 29, wherein said locking means includes a sleeve, wherein said sleeve is axially reciprocal with respect to said body and is mounted to said chuck.

* * * * *